US008736706B1

(12) United States Patent
Valente et al.

(10) Patent No.: US 8,736,706 B1
(45) Date of Patent: May 27, 2014

(54) METHOD AND SYSTEM FOR GENERATING HIGH RESOLUTION COMPOSITE IMAGES

(75) Inventors: Matthew Thomas Valente, Mountain View, CA (US); Richard Francis Lyon, Los Altos, CA (US); Peter Gregory Brueckner, Santa Cruz, CA (US)

(73) Assignee: Google Inc., Mountain View, CA (US)

( * ) Notice: Subject to any disclaimer, the term of this patent is extended or adjusted under 35 U.S.C. 154(b) by 144 days.

(21) Appl. No.: 13/418,598

(22) Filed: Mar. 13, 2012

(51) Int. Cl.
*H04N 5/228* (2006.01)

(52) U.S. Cl.
USPC ............. 348/222.1; 348/218.1; 382/284; 382/299

(58) Field of Classification Search
CPC ............ G06T 3/4053; H04N 5/23238; H04N 5/23232
USPC .......... 348/222.1, 218.1, 219.1; 382/299, 284
See application file for complete search history.

(56) References Cited

U.S. PATENT DOCUMENTS

| | | | |
|---|---|---|---|
| 7,015,954 B1 * | 3/2006 | Foote et al. | 348/218.1 |
| 7,646,932 B1 | 1/2010 | Peterson | |
| 7,860,343 B2 | 12/2010 | Tico et al. | |
| 2005/0237631 A1 * | 10/2005 | Shioya et al. | 359/770 |
| 2010/0172549 A1 | 7/2010 | Weiss | |

OTHER PUBLICATIONS

Kovacs et al., "Focus Area Extraction by Blind Deconvolution for Defining Regions of Interest", IEEE Transactions on Pattern Analysis and Machine Intelligence, vol. 29, No. 6, Jun. 2007, pp. 1080-1085.
Shaked et al., "Sharpness Measure: Towards Automatic Image Enhancement", In Proceedings of ICIP (1). 2005, 937-940.

* cited by examiner

*Primary Examiner* — Paul Berardesca
(74) *Attorney, Agent, or Firm* — Dority & Manning, P.A.

(57) ABSTRACT

Methods and systems for generating high resolution composite imagery are provided. The methods and systems can create a fully-in-focus high resolution composite image by combining a number of source images in which only a part of the source image is in-focus. The composite image can be analyzed to identify portions of the composite image that satisfy an image quality metric. The capture of additional source images can be controlled based at least in part on the image analysis of the composite image. In addition, a control routine for capturing the plurality of source images can be dynamically adjusted based on the image quality of the individual source images.

13 Claims, 10 Drawing Sheets

METHOD AND SYSTEM FOR GENERATING HIGH RESOLUTION COMPOSITE IMAGES

FIELD

The present disclosure relates generally to high resolution imagery, and more particularly, to methods and systems for capturing high resolution composite imagery.

BACKGROUND

Improvements in computer processing power have led to the availability of high resolution digital images, including gigapixel and even terapixel images. These high resolution images can be used to depict various objects or locations in intricate detail for observation by interested parties. Improvements in broadband technology have allowed such high resolution imagery to be made available over the Internet. For instance, the Google Art Project services provided by Google Inc. provide access to high resolution images of various works of art from worldwide galleries.

High resolution imagery is typically captured by compositing a single image from a large number of individual shots captured by a camera. To capture a high number of individual frames in a timely manner, it is typically necessary to rely on an autofocus mechanism to properly focus the camera on the subject matter. Autofocus typically allows the camera to bring the subject into focus regardless of the orientation and position of the camera with respect to the subject. Autofocus systems are never perfectly accurate, due to camera off-angle effects, curvature in the subject, or many other effects. As a result, a portion of the individual images used to generate the high resolution composite image can be in proper focus, but a large portion of the individual images can be out of focus.

This can negatively impact the performance of a system for capturing a high resolution composite image due to the need to recapture out of focus regions of a frame, often with manual oversight. For instance, the out of focus regions of the individual frames may only become apparent after manual observation of the images. In addition, the image capture system may have to be manually directed to recapture portions of the subject that were not properly in focus during the first pass of the image capture system.

SUMMARY

Aspects and advantages of the invention will be set forth in part in the following description, or may be obvious from the description, or may be learned through practice of the invention.

One exemplary aspect of the present disclosure is directed to a method for generating a high resolution composite image of an object. The method includes capturing a plurality of source images of the object with an image capture system having at least one image capture device. Each of the source images is associated with a different region of the object. The method further includes receiving position data associated with the plurality of source images; combining the plurality of source images into a composite image based on the position data; performing an image quality analysis of the composite image to identify portions of the composite image that satisfy an image quality metric; and controlling, with a control system, the capture of additional source images by the image capture device based at least in part on the image quality analysis.

Another exemplary aspect of the present disclosure is directed to a method for generating a high resolution composite image of an object. The method includes controlling an image capture system having at least one image capture device to capture a plurality of source images pursuant to a control routine; performing an image quality analysis on at least one source image to identify segments of the source image that satisfy the image quality metric; adjusting the control routine based at least in part on the identified segments of the source image that satisfy the image quality metric; and combining the plurality of source images into a composite image.

Other exemplary aspects of the present disclosure are directed to systems, apparatus, and computer readable media for generating a composite image from a plurality of source images.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
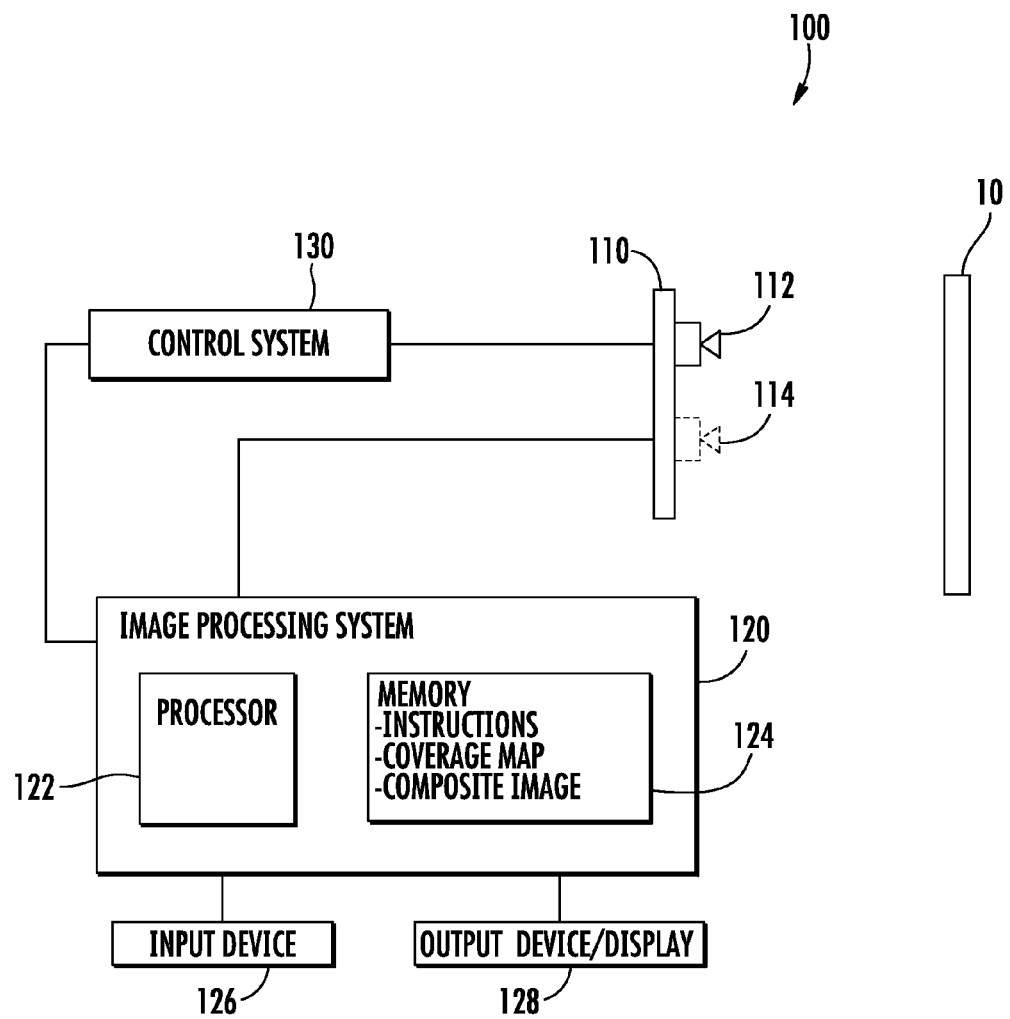
FIG. 1 depicts a block diagram of an exemplary system for generating a high resolution composite image according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a system and method for generating a high resolution composite image, such as a gigapixel image or a terapixel image. The system and method can create a fully-in-focus high resolution composite image by combining a number of source images in which only a part of the source images are in-focus. Image analysis techniques can be performed on the high resolution composite image to identify portions of the high resolution image that satisfy a predetermined image quality metric, such as a measure of the sharpness of the image. Once these portions have been identified and had their locations or boundaries denoted, a control system can control the capture of additional source images to recapture portions of the object that did not originally meet the image quality metric. In this manner, the generation of a high resolution composite image can be automatically controlled with little manual oversight.

According to a particular aspect of the present disclosure, a coverage map can be generated that identifies the coordinates of the identified portions of the composite image that satisfy the image quality metric. The coverage map can be analyzed by an image processing system to identify the locations of portions of the composite image that do not meet the image quality metric. Control commands can then be generated to control an image capture device to recapture source images associated with the portions of the composite image that did not meet the image quality metric so that a high resolution composite image can be achieved.

The coverage map can also facilitate control of an image capture system having a plurality of image capture devices. More particularly, the coverage map can provide the exact coordinates of in-focus imagery for source images captured by multiple image capture devices, even though the image capture devices are capturing source images from different areas of the object. The coverage map can then be analyzed to determine control commands for the plurality of image capture devices to recapture source images of the object. In this regard, the coverage map acts as a global resource for generating control commands for controlling the multiple image capture devices.

According to another particular aspect of the present disclosure, the capture of the plurality of source images can be controlled to provide for optimum capture of the source images. For instance, a control routine can be developed to capture a plurality of source images. The control routine provides for a certain overlap in the source images such that a after a plurality of the source images have been captured and combined into a composite image, a significant portion the composite image is in proper focus or otherwise satisfies an image quality metric. The control routine can be initially calculated based on depth of field, angle off axis, and other parameters for an image capture device.

To enhance the capture of the plurality of source images, the control routine can be adjusted in close to real time as the image capture system captures the plurality of source images. In particular, the individual source images can be analyzed as they are captured to identify in-focus segments of the source images. For instance, the source images can be individually analyzed as they are captured to identify segments that satisfy an image quality metric. The identified portions can be compared to portions of the source image that were expected to be in focus based on the depth of field, angle off axis, and other parameters of the image capture device. The control routine can be adjusted based on the deviation of the actual in-focus portions of the source image from the expected in-focus portions to improve the capture of source images to be used in generating the composite image. For instance, the control routine can be used to adjust the overlap between the source images so that a greater portion of the composite image is in focus after a single pass of the image capture device relative to the object.

FIG. 1 depicts a system 100 for generating a high resolution composite image of an object 10 according to an exemplary embodiment of the present disclosure. The system 100 includes an image capture system 110, an image processing system 120, and a control system 130 coupled to the image capture system 110. The image capture system 110 is used to capture a plurality of source images of the object 10.

The image processing system 120 is used to combine the plurality of source images into a composite image of the object 10. The image processing system 120 is also configured to perform image analysis on the composite image to identify portions of the composite image that satisfy an image quality metric. The image processing system 120 can generate control commands for implementation by the control system 130 to control the image capture system 110 to recapture portions of the object 10 that did not satisfy the image quality metric.

In addition, the image processing system 120 can perform image analysis on the individual source images as they are captured by the image capture system 110. Based on the analysis of the individual source images, the control routine implemented by the control system 130 for capturing the individual source images 120 can be adjusted as the image capture system 110 is capturing the plurality of source images to provide for improved capture of high quality images of the object 10. In this manner, an appropriate high resolution composite image, such as a gigapixel or terapixel image, of the object 10 can be generated with reduced manual intervention.

The image capture system 110 includes an image capture device 112, such as a digital camera. As illustrated, the image capture system can include additional image capture devices, including image capture device 114. Image capture device 114 is illustrated in dashed line to indicate that image capture system 110 can include any number of image capture devices as desired.

Figure 2:
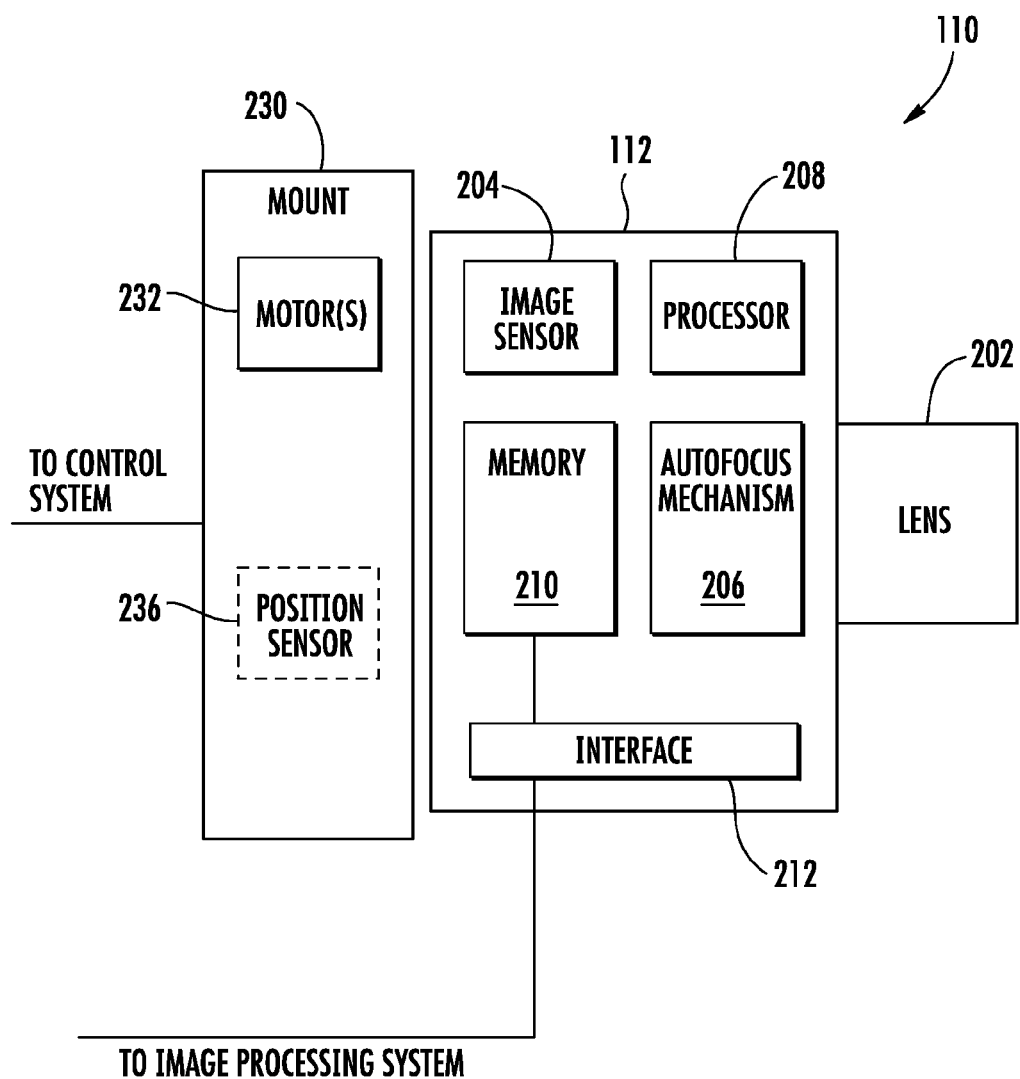
FIG. 2 depicts a block diagram of an exemplary image capture system according to an exemplary embodiment of the present disclosure.

FIG. 2 depicts a block diagram of an exemplary image capture system 110 according to an exemplary embodiment of the present disclosure. Image capture system 110 includes an image capture device 112 that is mounted to a camera positioning device 230, such as a camera mount. The image capture device 112 can include typical components of a digital camera, such as a lens 202, an image sensor 204, a processor 208, and a memory 210. The image sensor 204 converts an optical image captured by the lens 202 and converts it into a digital image that can be stored in memory 210. The image sensor 204 can include an array of pixel sensors, such as an array of photodiodes. Each of the pixel sensors can output a signal that is used to generate a pixel of a digital image. As will be discussed in detail below, position data for an image captured by the image capture device 112 can be determined based on information received from the image sensor 202. For instance, each pixel of the digital image can be associated with a position based on the associated pixel sensor in the image sensor 202. The images captured by the image capture device 112 can be stored in memory 210 and can also be communicated via interface 212 to the image processing system 120 (shown in FIG. 1), along with associated position data, for use in generating a high resolution composite image.

Image capture device 112 further includes an autofocus mechanism 206. The autofocus mechanism 206 controls the lens 202 and various other components of the image capture device 112 to properly focus the image capture device 112 on the object. As the image capture device 112 is continuously capturing source images of an object, the autofocus mechanism 206 causes the image capture device 112 to bring the object into focus regardless of the orientation and position of the camera with respect to the object. The autofocus mechanism 206 is never perfectly accurate due to, for instance, camera off angle effects, curvature in the subject, and other effects. This can result in only a part of the individual source images captured by the image capture device 112 having the requisite focus characteristics suitable for use in a high resolution composite image. According to aspects of the present disclosure, these capture of source images and generation of the high resolution composite image can be controlled based on identified in-focus and out-of-focus portions of the source images.

Image capture device 112 can be mounted to a positioning device 230, such as a camera mount. The positioning device 230 is configured to adjust the position of the image capture device 112 relative to the object as the image capture device captures a plurality of source images of the object. The positioning device 230 can be controlled by a control system such as the control system 130 of FIG. 1, to point the image capture device 112 at various locations on the object. A control system can also be used to direct the image capture device 112 to capture various source images of the object at various locations on the object.

In a particular embodiment, the positioning device 230 can be a pan/tilt mount for the image capture device 230. The pan/tilt mount can adjust the pan angle and the tilt angle of the image capture device 112 relative to the object. In another embodiment, the positioning device 230 can impart motion of the image capture device 112 along an x-axis, y-axis, and/or z-axis relative to the object.

The positioning device 230 can include one or motors 232 to control the position of the positioning device 230 pursuant to commands from a control system. The motors 232 can track position information, such a pan angle and a tilt angle of a pan/tilt camera mount. Alternatively, position information can be captured by one or more position sensors 236 associated with the positioning device 230. The position information or data can be associated with individual source images captured by image capture device 112 and communicated through interface 212 to an image processing system for use in generating a high resolution composite image and a coverage map as will be discussed below.

Referring back to FIG. 1, image processing system 120 includes one or more processor(s) 122 and a memory 124. Processor(s) 122 can be configured to receive input data including source images and associated position data from image capture system 110, and to combine the source images into a composite image. Memory 124 can include any suitable computer-readable medium or media, including, but not limited to, RAM, ROM, hard drives, flash drives, or other memory devices.

Memory 132 stores information accessible by processor(s) 122, including instructions that can be executed by processor (s) 122. The instructions can be any set of instructions that when executed by the processor(s) 122, cause the processor (s) 122 to provide desired functionality. For instance, the instructions can cause the processor to analyze source images or the composite image to identify portions of the image that satisfy an image quality metric.

The instructions can be software instructions rendered in a computer-readable form. When software is used, any suitable programming, scripting, or other type of language or combinations of languages may be used to implement the teachings contained herein. Alternatively, the instructions can be implemented by hard-wired logic or other circuitry, including, but not limited to application-specific circuits.

Memory 124 can also include data that can be retrieved, manipulated, created, or stored by processor(s) 122. For instance, memory 124 can include source images received from the image capture system 110, position data associated with the source images, a coverage map, and/or a high resolution composite image generated from the plurality of source images.

Image processing system 120 can include or be coupled to one or more input devices 126 and output devices 128. Input device 126 may correspond to one or more peripheral devices configured to operate as a user interface with image processing system 140. Exemplary input devices can include but are not limited to a keyboard, touch-screen monitor, microphone, mouse and other suitable input devices. Output device 148 may correspond to a visual display device. As will be discussed below, the visual display can be used to display the high resolution composite image or a coverage map to a user.

Image processing system 120 can also be coupled to a control system 130. While the control system 130 is depicted in FIG. 1 as separate from the image processing system 120, those of ordinary skill in the art, using the disclosures provided herein, should understand that the control system 130 could also be a part of the image processing system 120 and/or a part of the image capture system 110 without deviating from the scope of the present disclosure.

The control system 130 is used to provide control commands to the various components of the image capture system 110 to control the capture of source images of the object 10. For instance, the control system 130 can control the position of the image capture device 112 relative to the object by sending control commands to a positioning device associated with the image capture device 112. The control system 130 can also control the image capture device 112 by sending signals to the image capture device 112 directing the image capture device 112 to capture source images of the object 10. The control system 130 can be any suitable control device, such as processor, microcontroller, or other suitable control circuit.

Due to the inherent flexibility of computer based systems, system 100 can take a variety of forms. For instance, in one embodiment, the image processing system 120 and the control system 130 can be part of a general purpose computer. Alternatively, the image processing system 120 and the control system 130 can be stand alone special purpose computing devices dedicated to perform the functionality discussed herein. Even still, the image processing system 120 and the control system 130 can form part of the image capture system 110 and can be associated with either the positioning device 230 or image capture device 112.

Figure 3:
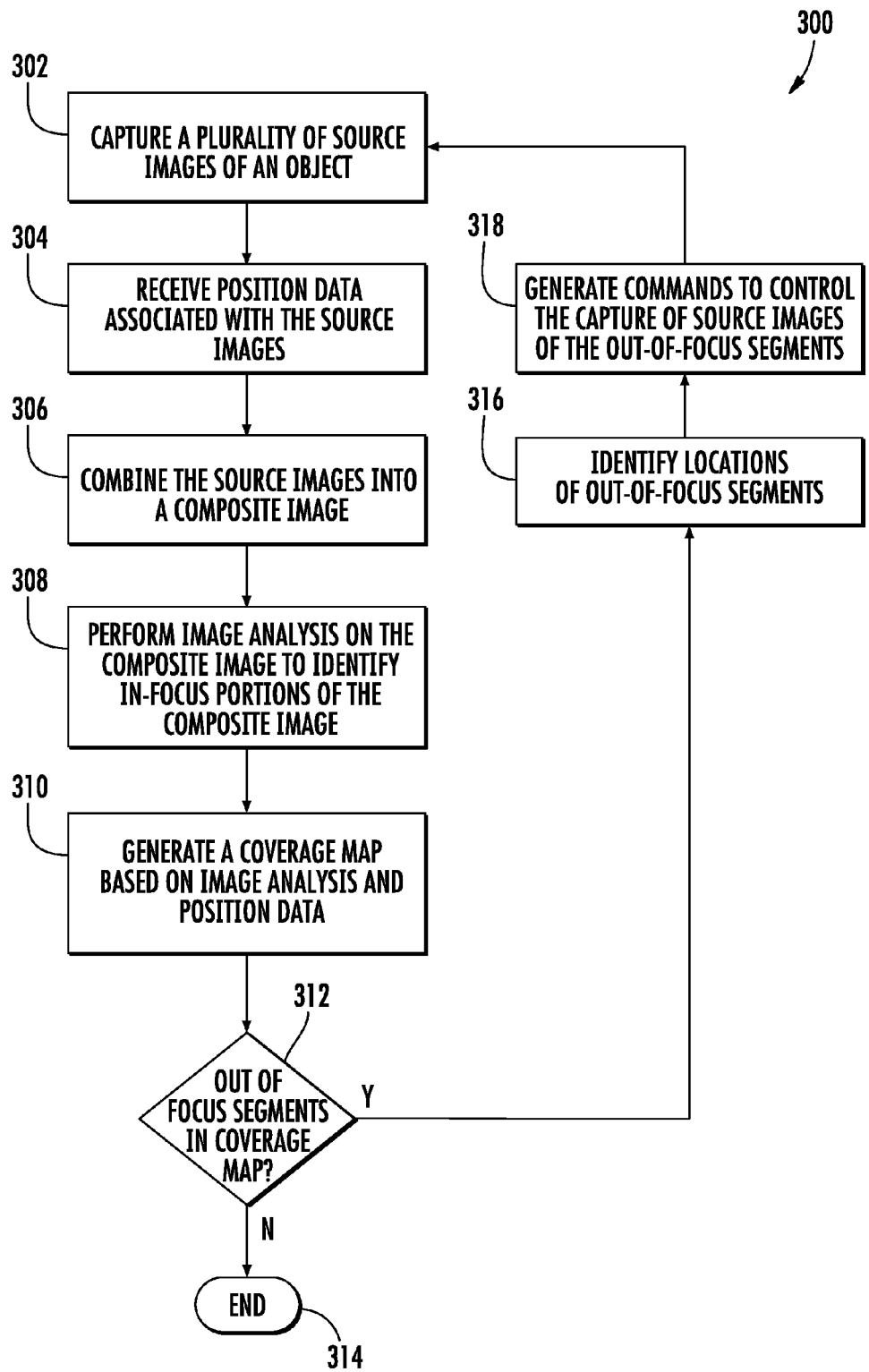
FIG. 3 depicts a flow chart of an exemplary method for generating a high resolution composite image according to an exemplary embodiment of the present disclosure.

FIG. 3 depicts a flow chart of an exemplary method 300 used for generating a high resolution composite image according to an exemplary embodiment of the present disclosure. While the method 300 will be discussed with reference to the system 100 of FIGS. 1 and 2, those of ordinary skill in the art should understand that the exemplary method 300 can be performed by other suitable image capture systems.

Figure 4:
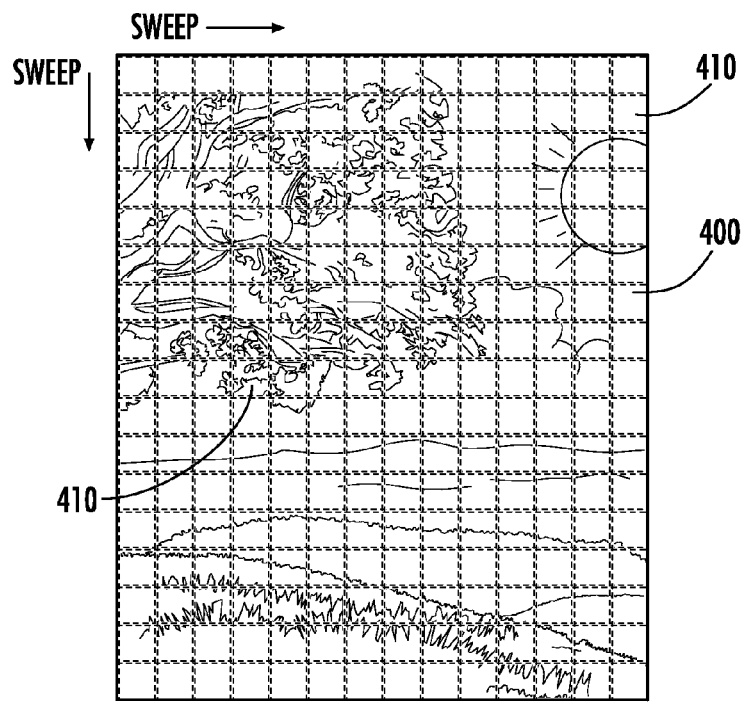
FIG. 4 conceptually illustrates the source image capture of an exemplary object according to an exemplary embodiment of the present disclosure.

At (302), the method captures a plurality of source images of an object. The capture of a plurality of source images 410 of an object 400 is conceptually illustrated in FIG. 4. The object 400 depicted in FIG. 4 is a work of art. However, those of ordinary skill in the art, using the disclosures provided herein, should understand that the present disclosure is not limited to any particular type of object and can include, for instance, geographic areas, buildings, scenes, panoramas, etc.

As shown in FIG. 4, multiple source images 410 are captured of different regions of the object 400. The source images 410 can be captured by controlling an image capture device to sweep across the object 400. For instance, the control system 130 (shown in FIG. 1) can control the positioning device 230 (shown in FIG. 2) to sweep the pan angle and the tilt angle of the image capture device 112 (shown in FIGS. 1 and 2) across the object 400. The pan and tilt sweep can be performed in any particular order, such as from top to bottom or from left to right. Alternatively, a positioning device can be controlled to sweep an image capture device in an x-axis and a y-axis relative to the object 400.

A plurality of individual source images 410 are captured of the object 400 as the image capture device sweeps the object 400. As shown in FIG. 4, each of the plurality of source images 410 overlap one another to a certain degree to ensure that all portions of the object 400 are captured during a single pass of the image capture device relative to the object 400. The overlap between the source images 410 can be controlled pursuant to a control routine calculated to provide an optimum capture of the source images. The control routine can be calculated based on depth of field, angle off axis, and other parameters of the image capture device. According to aspects of the present disclosure, the control routine can be adjusted as the plurality of source images are being captured such that more in-focus regions are captured during a single sweep or pass of the image capture device relative to the object 400.

Figure 5:
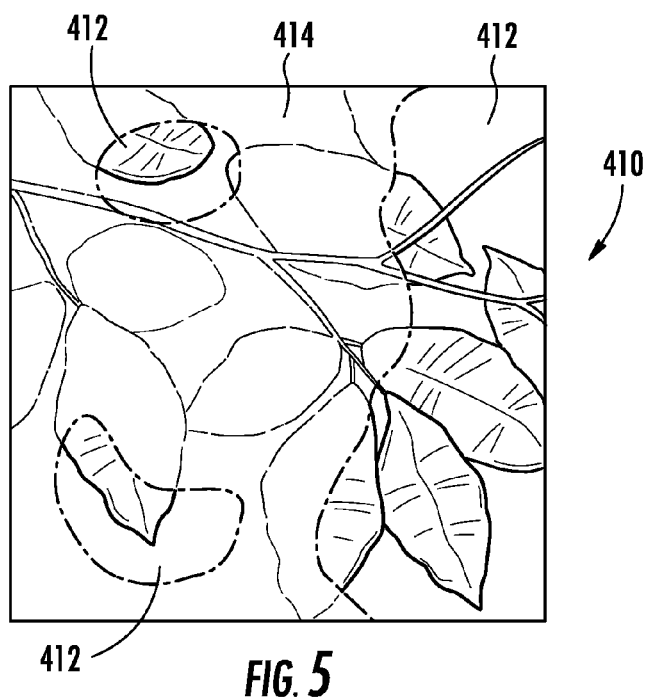
FIG. 5 depict an exemplary source image used to generate a high resolution composite image according to an exemplary embodiment of the present disclosure.

An autofocus mechanism associated with the image capture device can attempt to bring the object 400 into proper focus as the image capture device sweeps the object 400. The autofocus mechanism, however, often times cannot bring an entire frame or source image into proper focus due to various effects. FIG. 5 demonstrates an exemplary source image 410. As shown, the source image 410 includes a plurality of segments 412 that are in proper focus. A substantial portion 414 of source image 410, however, remains out of focus and is not suitable for use in compositing a high resolution image of the subject artwork 400. According to aspects of the present disclosure, a high resolution composite image can be generated despite the out of focus regions in the captured source images.

Referring back to FIG. 3 at (304), the method receives position data associated with the plurality of source images. The position data can be used to identify coordinates of individual pixels in the source images. In one example, each pixel in the plurality of source images can be assigned data corresponding to a position in a two-dimensional or three-dimensional space associated with the object. For instance, the data can identify the location of a pixel in an x-axis, y-axis, and/or z-axis associated with the object. This data is used to assign pixels to specific locations in a high resolution composite image or in a coverage map associated with the composite image.

The position data can be assigned to individual pixels based on information received from the image capture system. For instance, the positioning device 230 (shown in FIG. 2) used in the image capture system 110 can track position information, such as a pan angle and tilt angle of the image capture device 112, as the image capture device 112 captures the source images. This position information can be associated with the source image for use in assigning position data to individual pixels in the captured source images. As an example, the pan angle and the tilt angle associated with a particular source image can be used to calculate positions of pixels the source image.

Further still, position information can be based on information from an image sensor of the image capture device. For instance, each pixel in a source image can be associated with a pixel sensor in a pixel sensor array of the image sensor 204 (shown in FIG. 2). The particular pixel sensor can provide location information for each pixel in the source image. Specific x, y, and/or z coordinates can be assigned to individual pixels in extracted segments of the source images based on information derived from the pixel sensor array of the image sensor 204 and the position information from the positioning device 230.

At (306) the method combines the plurality of source images into a composite image based on the position data. The locations of the individual extracted pixels in the composite image can be determined based on the position data associated with the pixels. The source images can be combined into the composite image using any suitable image processing techniques. For instance, the image processor 120 (shown in FIG. 1) can composite, stitch, and/or stack pixels from the source images together to form the composite image. Those of ordinary skill in the art, using the disclosures provided herein, should appreciate that a variety of different techniques for generating a composite image from a plurality of source images are known. Any of these techniques can be used without deviating from the scope of the present disclosure.

Figure 6:
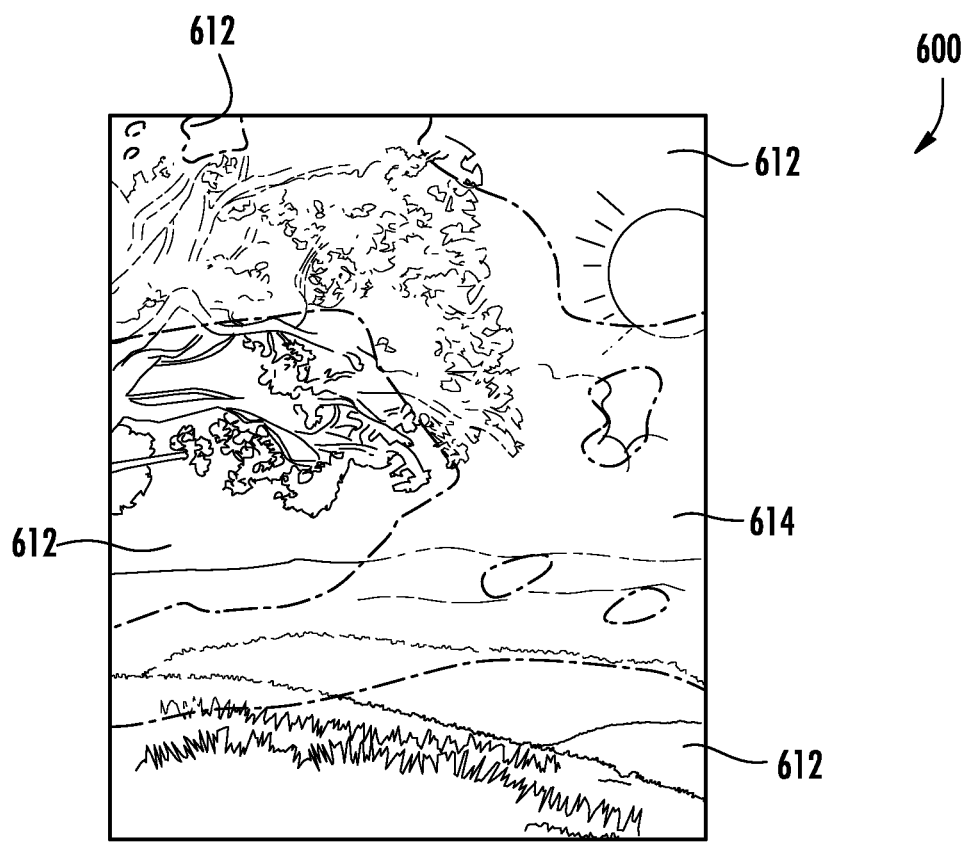
FIG. 6 depicts an exemplary composite image obtained according to an exemplary embodiment of the present disclosure.

FIG. 6 depicts an exemplary composite image 600 formed from a plurality of source images. The composite image 600 can be a gigapixel image or a terapixel image. Because only portions of the source images used to generate the composite image are in-focus, significant portions of the composite image 600 can remain out-of-focus. For instance, FIG. 6 illustrates that the composite image 600 includes portions 612 that are properly in-focus. Composite image 600 also includes many portions 614 that are not in focus. Additional source images will need to be captured and composited into the image 600 to remedy the out-of-focus portions 614 and generate a suitable high resolution composite image.

Referring back to FIG. 3 at (308), the method performs image analysis on the composite image to identify portions of the composite image that are properly in focus and portions of the composite image that are not properly in focus. The capture of additional source images can be controlled to generate the high resolution composite image based on the image quality analysis.

For instance, the image processing system 120 (FIG. 1) can perform image analysis on the composite image to identify portions of the composite image that satisfy an image quality metric. The image quality metric can be any objective measurement of the suitability of a portion of the composite image for use in a high resolution composite image. In one example, the image quality metric can provide a measure of the sharpness of the image. Sharper portions of an image reveal more detail about an object, such as textures, edges, and fine details. Thus, it can be desirable that the high resolution composite image be composed of portions having a relatively high sharpness.

The sharpness of particular portions of the composite image can be assessed by analyzing the frequency components of the composite image. For instance, the sharpness of a particular portion of the composite image can be analyzed by determining the ratio of high frequency components of a portion of the composite image to the low frequency components of the composite image. Portions of the composite image having a relatively high ratio of high frequency components to low frequency components can have a sharp appearance and may be suitable for use in a high resolution composite image. In contrast, portions of the composite image having a relatively low ratio of high frequency components to low frequency components can result in the image having a duller, more out-of-focus appearance. These portions of the composite image are not suitable for use in a high resolution composite image.

The predetermined image quality metric can include a predetermined threshold ratio of high frequency components to low frequency components. Portions of the composite image having a ratio of high frequency components to low frequency components that exceeds the predetermined threshold ratio can satisfy the image quality metric. Portions of the composite image having a ration less than the predetermined threshold ration do not satisfy the image quality metric. The use of a ratio of high frequency components to low frequency components as the image quality metric can be preferred because it provides a relative metric that is applicable to many types of objects.

Figure 7:
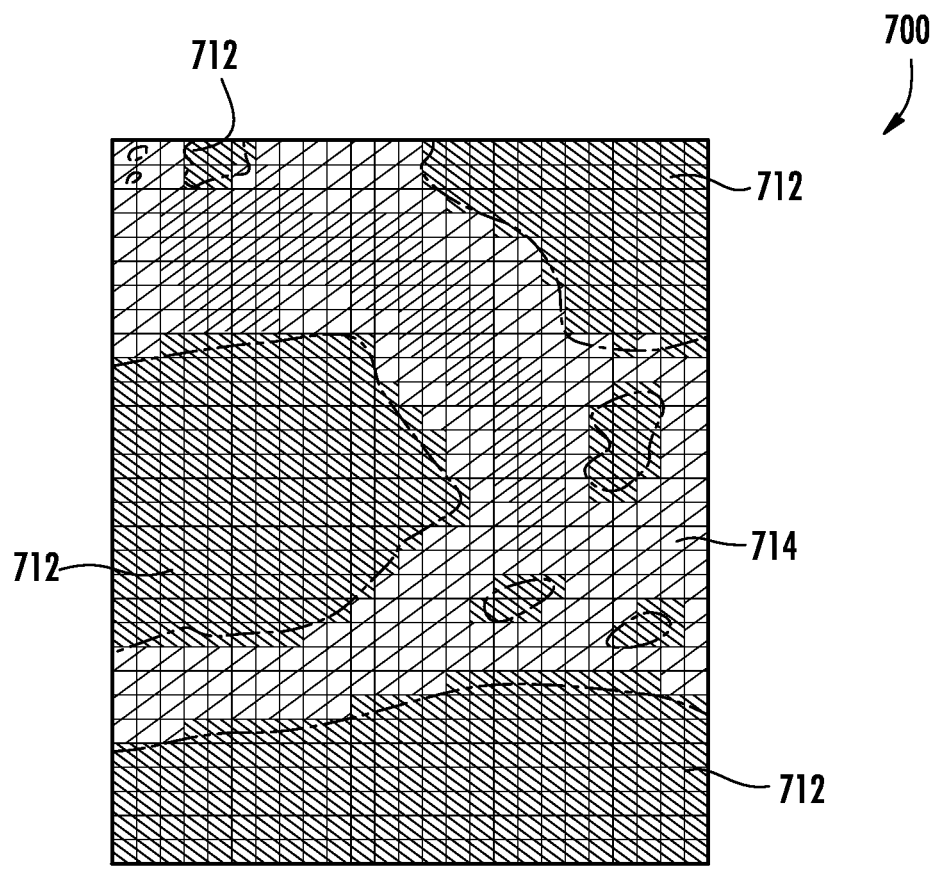
FIG. 7 depicts an exemplary composite image after undergoing image analysis to identify portions that satisfy an image quality metric according to an exemplary embodiment of the present disclosure.

FIG. 7 depicts a grayscale representation 700 of the results of an exemplary image analysis on the composite image of FIG. 6. The pixels 714 having a lighter shading are representative of lighter grayscale tones corresponding to portions of the composite image that have a reduced sharpness. The pixels 712 having darker shading are representative of darker grayscale tones corresponding to portions of the source image that have a sharpness sufficient for use in a high resolution composite image.

Based on the image analysis, the method can control the capture of additional source images to recapture images of regions of the object that did not satisfy the image quality metric. For instance, the image processing system 120 (shown in FIG. 1) can generate control commands for implementation by the control system 130 (shown in FIG. 1) to control the image capture system 110 (shown in FIG. 1) to recapture the source images of particular regions of the object.

In one implementation, the method controls the capture of additional source images by using a coverage map. For instance, referring back to FIG. 3 at (310), the method generates a coverage map based on the image analysis and position data associated with the source images. The coverage map precisely identifies the coordinates of the portions of the composite image that satisfy and/or do not satisfy the image quality metric. The coverage map can be generated in any suitable manner. In one embodiment, the coverage map is generated by identifying pixels or groups of pixels in the composite image that satisfy the image quality metric and analyzing position data associated with the identified pixels. The collected information can then be compiled into a coverage map for use in controlling the capture of additional source images.

The coverage map can be any compilation of data that identifies locations of suitable and/or unsuitable portions of the composite image. For instance, the coverage map can simply be a data compilation or table identifying pixel coordinates for pixels or groups of pixels meeting the requisite image quality metric. The data compilation could also identify pixel coordinates for pixels or groups of pixels that do not satisfy the requisite image quality metric.

Figure 8:
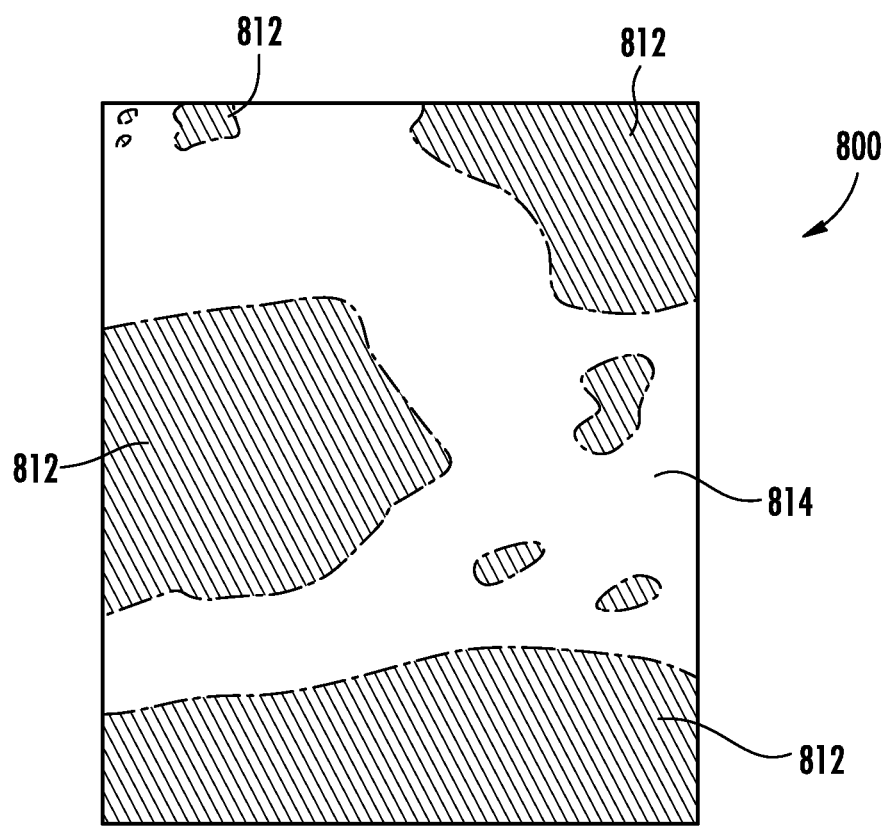
FIG. 8 depicts a coverage map of an exemplary composite image according to an exemplary embodiment of the present disclosure.

In one example, the coverage map can include a plot of the locations of both suitable portions and unsuitable portions of the composite image in a two-dimensional or three-dimensional space corresponding to the object. FIG. 8 depicts an exemplary plot of a coverage map 800 associated with the high resolution composite image 600 of FIG. 6. As shown, the plot of the coverage map 800 identifies locations of portions of the composite image that satisfy the image quality metric. In particular, the coverage map 800 includes shaded pixels 812 corresponding to higher pixel values at locations of suitable or in-focus portions of the composite image. The coverage map 800 also includes lighter pixels corresponding to lower pixel values at locations of unsuitable or out-of-focus portions. The coverage map 800 can be presented on a display device to a user for assistance in the generation of the high resolution composite image.

Referring to FIG. 3 at (312), the method analyzes the coverage map to identify out-of-focus portions in the composite image. For instance, the image processor 120 (shown in FIG. 1) can analyze the coverage map to determine whether one or more portions of the composite image do not satisfy the image quality metric. If the composite image does not include unsuitable portions (i.e. portions that do not satisfy the image quality metric), the entirety of the composite image satisfies the image quality metric and is suitable for use as a high resolution composite image and the method ends as shown at (316).

If one or more portions of the composite image that do not satisfy the image quality metric are identified, the method identifies the locations of these regions from the coverage map (318). For instance, the image processor 120 (shown in FIG. 1) can extract position data from the coverage map concerning the precise coordinates of any portions of the composite image that do not satisfy the image quality metric.

Once these coordinates are known, the method can generate control commands to recapture source images of the object associated with one or more portions of the composite image that do not satisfy the image quality metric (318). In one example, the coordinates of all portions of the composite image that do not satisfy the image quality metric can be compiled into a global list or compilation. The global list or compilation can be analyzed by the image processing system 120 (shown in FIG. 1) to determine a control routine for the recapture of source images. The control routine can be calculated based on depth of field, angle off axis, the coordinates of the portions of the composite image that do not satisfy the image quality metric and other suitable parameters. The control routine can specify control commands that can be implemented by the control system 130 (shown in FIG. 1) to control the image capture system 110 (shown in FIG. 1) to recapture source images of regions of the object associated with the out-of-focus portions of the composite image.

In one particular example, the control commands can be used to control an image capture system having a plurality of image capture devices. In particular, control commands for all image capture devices can be generated based on the locations of out-of-focus portions in the composite image. In this manner, the composite image and/or associated coverage map acts as a global resource for generating control commands for each of the plurality of image capture devices.

The additional source images captured pursuant to the control commands can be processed in a similar manner to the steps of the method 300 outlined above. The image processing system 120 (shown in FIG. 1) can replace portions of the composite image with higher quality portions from the recaptured source images, improving the overall image quality of the composite image. The method 300 can be repeated until all portions of the composite image meet the image quality metric, resulting in a suitable high resolution composite image of an object.

Figure 9:
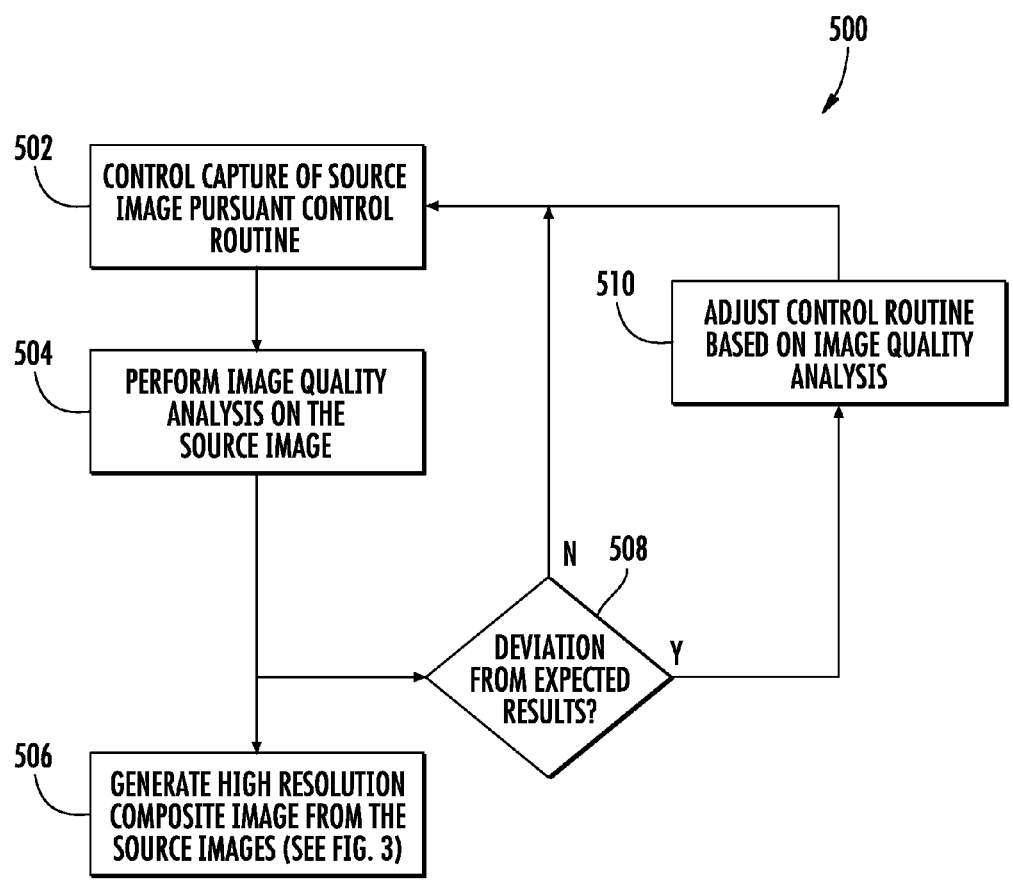
FIG. 9 depicts a flow chart of an exemplary method for generating a high resolution composite image according to an exemplary embodiment of the present disclosure.

According to additional aspects of the present disclosure, the control of the capture of source images can be automatically adapted to improve the efficiency of the source image capture. FIG. 9 depicts an exemplary method 500 for generating a high resolution composite image that provides for an improved capture of source images used in generating the high resolution composite image. The exemplary method 500 will be discussed with reference to the system 100 of FIGS. 1 and 2. However, those of ordinary skill in the art should understand that the exemplary method 500 can be performed by other suitable image capture systems.

At (502), the method controls the capture of source images of an object pursuant to a control routine. As discussed above with reference to FIG. 4, a plurality of source images 410 of an object can be captured with a certain degree of overlap with one another to ensure that all portions of the object 400 are captured during a single pass of the image capture device relative to the object 400. The overlap between the source images 410 can be controlled pursuant to a control routine calculated to provide an optimum capture of the source images.

The control routine can be calculated based on depth of field, angle off axis, and other parameters of the image capture device. In particular, based on the depth of field, angle off axis of the image capture device, and other parameters, a certain portion of the source image is expected to be in-focus and a certain portion of the source image is expected to be out-of-focus during capture of the source images. The control routine provides for overlap between the source images such that more in-focus regions of the object are captured during a single pass of the image capture device relative to the object. Often times, however, the actual in-focus portions of the source images deviate from the expected in-focus portions.

For example, FIG. 5 demonstrates an exemplary source image 410 captured pursuant to the control routine. As shown, the source image 410 includes a plurality of segments 412 that are in proper focus and a plurality of segments 414 that are out of focus.

Figure 10:
FIG. 10 depicts a conceptual diagram of expected in-focus regions of a source image according to an exemplary embodiment of the present disclosure.

FIG. 10 depicts a conceptual representation of the expected in-focus regions of the source image 410. As shown in the comparison between FIG. 5 and FIG. 10, substantial portions of the actual source image are out-of-focus relative to the expected out-of-focus regions. In this regard, the control routine used to capture the plurality of source images needs to be adjusted, for instance, to provide more overlap between source images, to ensure that more suitable portions of the composite image are provided after a single pass of the image capture device relative to the object.

The method 500 shown in FIG. 10 provides for close to real time adaptation of the control routine for capturing images based on an image analysis of the in-focus regions. For instance, at (504) the method performs an image analysis on at least one source image. The image analysis can be performed by the image processing system 120 (shown in FIG. 1). Similar to the image analysis of the composite image above, the image analysis can identify regions of the source image that satisfy an image quality metric, such as a measure of the sharpness of the image. For instance, the image quality metric can be based on a ratio of high frequency components of the source image to low frequency components of the source image.

Figure 11:
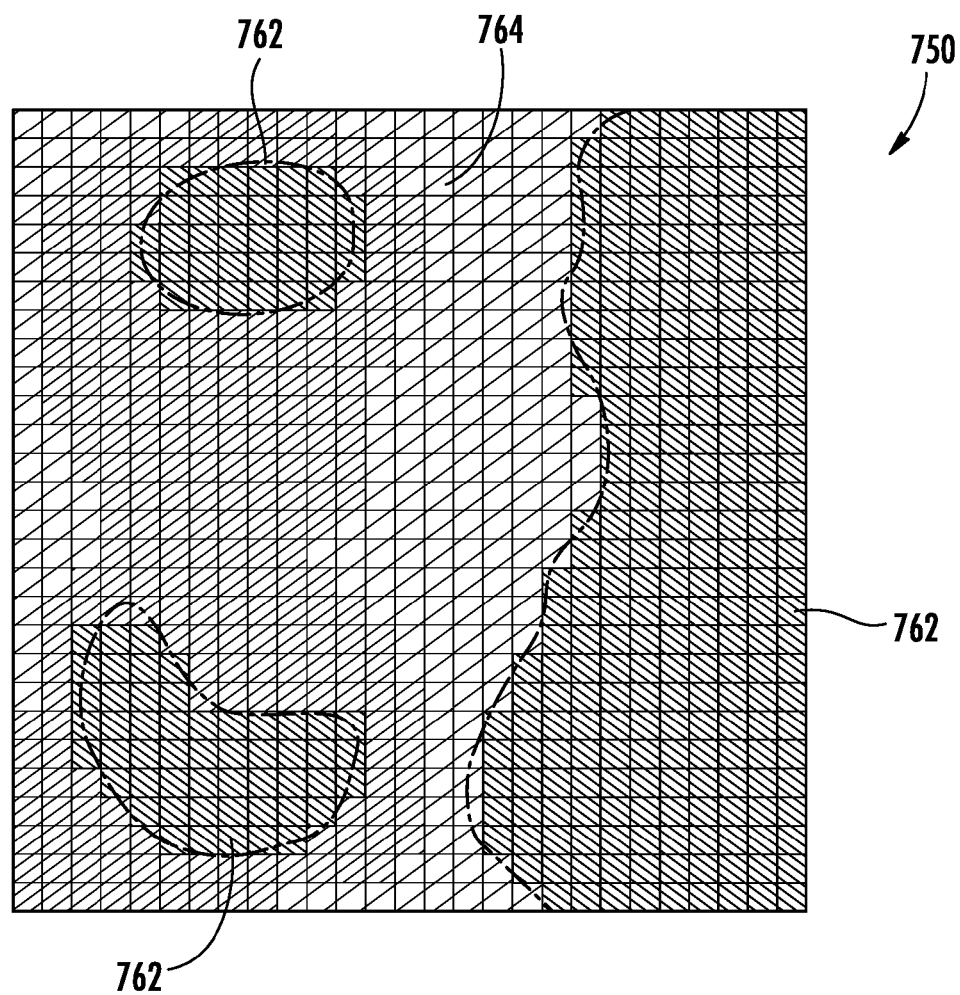
FIG. 11 depicts an exemplary source image after undergoing image analysis to identify segments that satisfy an image quality metric according to an exemplary embodiment of the present disclosure.

FIG. 11 depicts a grayscale representation 750 of the results of an exemplary image analysis on the exemplary source image of FIG. 5. The pixels 764 having a lighter shading are representative of lighter grayscale tones corresponding to portions of the composite image that have a reduced sharpness. The pixels 762 having darker shading are representative of darker grayscale tones corresponding to portions of the source image that have a sharpness sufficient for use in a high resolution composite image.

As demonstrated in FIG. 11, the image analysis identifies segments of the source image that satisfy an image quality metric. The segments can be non-contiguous segments of the source image. The method 500 can determine whether the identified segments deviate from expected in-focus segments based on the calculated control routine as shown at (508) of FIG. 10. If there is no deviation, there is no need to adjust the control routine. The method continues to control the capture of source images pursuant to the original control routine.

If there is a deviation from the expected in-focus segments based on the calculated control routine, the method will adjust the control routine to provide for more or less overlap between the source images as required (510). For instance, if a greater portion of the source image is in focus than expected, the overlap between the source images can be reduced to provide for a quicker capture of source images used in the generation of the high resolution composite image. If a lesser portion of the source image is in focus than expected, the overlap between source images can be increased to provide that more in-focus regions are captured during a single pass of the image capture device relative to the object. In this manner, the subject matter of the present disclosure can provide for a dynamic control routine that is adjusted in close to real time during the capture of source images based on the image quality of the individual source images.

Referring still to FIG. 5 at (506), the plurality of source image captured pursuant to the control routine (or adjusted control routine) are used for generating a high resolution composite image. In one exemplary implementation, the source images can be combined into a composite image according to the exemplary method 300 for generating a composite image from a plurality of source images discussed above with reference to FIG. 3. However, any suitable technique for generating the high resolution composite from the plurality source images can be used without deviating from the scope of the present disclosure.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for generating a high resolution composite image of an object, the method comprising:
accessing, by one or more processing devices, a plurality of source images of the object captured by an image capture system having at least one image capture device, each of the source images being associated with a different region of the object;
receiving, by the one or more processing devices, position data associated with the plurality of source images;
combining, by the one or more processing devices, the plurality of source images into a composite image based on the position data;

performing, by the one or more processing devices, an image quality analysis of the composite image to identify portions of the composite image that satisfy an image quality metric; and controlling, by the one or more devices, the capture of additional source images by the image capture device based at least in part on the image quality analysis;

wherein controlling, by the one or more processing devices, the capture of additional source images by the image capture device based at least in part on the image quality analysis, comprises:

generating, by the one or more processing devices, a coverage map associated with the composite image based on the position data, the coverage map specifying spatial coordinates of the portions of the composite image that satisfy the image quality metric;

analyzing, by the one or more processing devices, the coverage map to determine the location of the one or more portions of the composite image that do not satisfy the image quality metric; and generating, by the one or more processing devices, control commands to control the image capture device to capture source images of the object associated with the one or more portion of the composite image that do not satisfy the image quality metric.

2. The method of claim 1, wherein the image quality metric provides a measure of the sharpness of the composite image.

3. The method of claim 2, wherein the image quality metric is based at least in part on a ratio of high frequency components to low frequency components of the image.

4. The method of claim 1, wherein the position data comprises information received from the image capture system identifying the position of the image capture device when a source image was captured.

5. The method of claim 1, wherein the plurality of source images are captured by performing operations, the operations comprising:

controlling, by the one or more processing devices, the image capture system to capture at least one source image pursuant to a control routine;

performing, by the one or more processing devices, an image quality analysis on the source image to identify segments of the source image that satisfy the image quality metric; and adjusting, by the one or more processing devices, the control routine based at least in part on the identified segments of the source image that satisfy the image quality metric.

6. The method of claim 5, wherein adjusting, by the one or more processing devices, the control routine based at least in part on the identified segments of the source image comprises adjusting, by the one or more processing devices the overlap between source image captured based on the identified segments of the source image.

7. The method of claim 1, wherein the image capture system comprises a plurality of image capture devices, the method comprising controlling, by the one or more processing devices, the plurality of image capture devices to capture additional source images based at least in part on the image quality analysis of the composite image.

8. The method of claim 1, wherein the composite image is a gigapixel image or a terapixel image.

9. A system for creating a high resolution composite image of an object, comprising:

an image capture system having at least one image capture device configured to capture a plurality of source images of the object, each of the source images being associated with a different region of the object;

an image processing system, the image processing system configured to receive position data associated with the plurality of source images; to combine the plurality of source images into a composite image based on the position data; and to perform an image quality analysis of the composite image to identify portions of the image that satisfy an image quality metric; and a control system configured to control the capture of additional source images by the image capture device based at least in part on the image quality analysis;

wherein the image processing system is further configured to:

generate a coverage map associated with the composite image based on the position data, the coverage map specifying spatial coordinates of the portions of the composite image that satisfy the image quality metric;

analyze the coverage map to determine the location of one or more portions of the composite image that do not satisfy the image quality metric; and generate control commands for the control system to control the image capture device to capture source images of the object associated with the portions of the composite image that do not satisfy the image quality metric.

10. The system of claim 9, wherein the image quality metric provides a measure of the sharpness of the image and is based on a ratio of high frequency components of the portion of the composite image to low frequency components of the composite image.

11. The system of claim 9, wherein the system further comprises a positioning device configured to adjust the position of the image capture device relative to the object as the image capture device captures the plurality of source images.

12. The system of claim 9, wherein the control system is configured to control the capture of the plurality of source images pursuant to a control routine, the image processing system configured to perform an image quality analysis on at least one source image to identify segments of the source image that satisfy the image quality metric; and adjust the control routine based at least in part on the identified segments of the source image that satisfy the image quality metric.

13. The system of claim 9, wherein the system comprises a plurality of image capture devices configured to capture a plurality of source images of the object, the control system configured to control the capture of additional source images by the plurality of image capture devices based at least in part on the image quality analysis.

* * * * *